Figure 3:
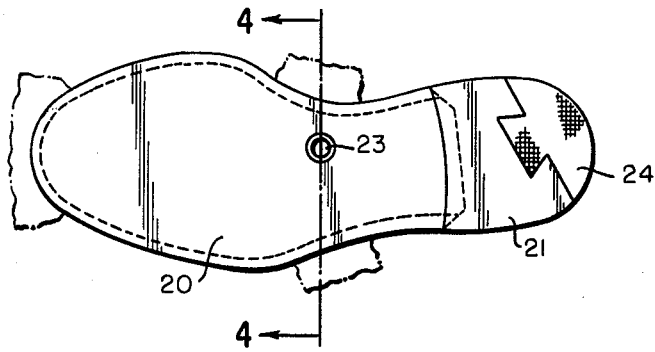

April 13, 1965  J. J. FERREIRA  3,177,598
SOLE UNIT OR SHOE BOTTOM
Filed Sept. 4, 1963  2 Sheets-Sheet 1
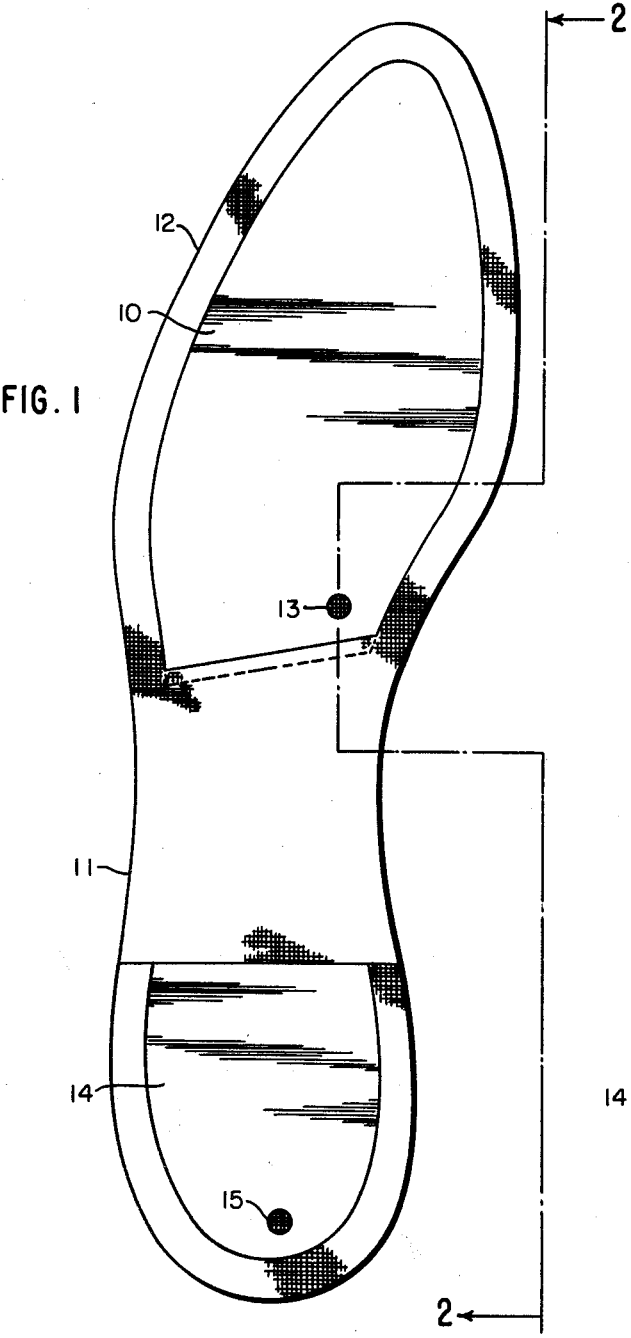
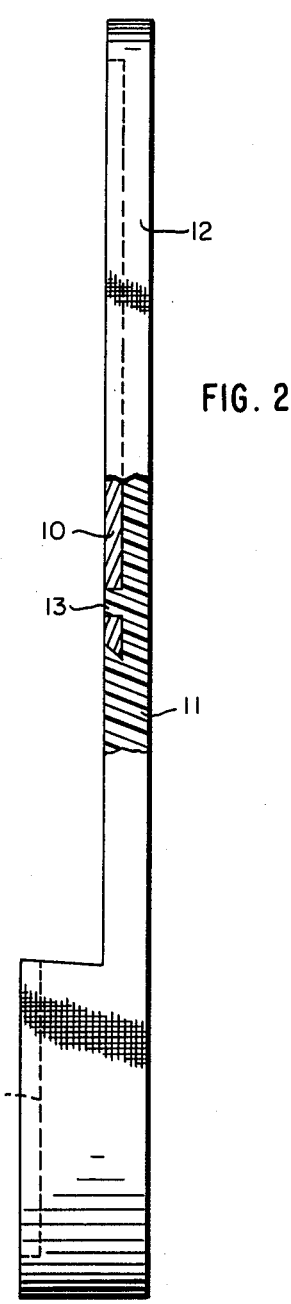
INVENTOR.
JOSEPH J. FERREIRA April 13, 1965   J. J. FERREIRA   3,177,598
SOLE UNIT OR SHOE BOTTOM
Filed Sept. 4, 1963   2 Sheets-Sheet 2

*INVENTOR.*
JOSEPH J. FERREIRA
BY 3,177,598
SOLE UNIT OR SHOE BOTTOM
Joseph J. Ferreira, Raynham, Mass., assignor to Joseph F. Corcoran Shoe Co., Inc., Stoughton, Mass., a corporation of Massachusetts
Filed Sept. 4, 1963, Ser. No. 306,489
1 Claim. (Cl. 36—30)

This invention finds its place in the new field of producing leather faced soles for shoe bottoms by the process of injection molding. It comprises a new and improved composite shoe bottom or sole unit characterized by a preformed leather sole piece providing a tread surface of substantial area in the sole and having a perforation therein, in combination with an integral body of PVC or the like which includes a ply coextensive with and bonded to the inner face of the leather sole piece, a mold-finished marginal bead which extends about the leather sole piece. In a preferred example of the invention the unit includes a stud upstanding from the PVC ply and interlocked in the perforation of the sole piece.

Shoe bottoms and soles have been produced heretofore by injecting PVC or oher synthetic resinous compound into a mold cavity formed in part by the bottom of a lasted shoe. I have discovered however that this process may be utilized in the production of soles having a full leather tread face that resembles in many features the soles found today in the finest type of Goodyear welt shoes.

In addition to its pleasing appearance a sole bottom constructed in accordance with my invention has many outstanding advantages. It is capable of production at much lower cost than a comparable welt shoe. It includes a built-in cushion beneath the foot of the wearer. It obviates the use of filler in the shoe and the step of bottom filling in is manufacturing process. It also eliminates the usual edge setting and edge finishing operations since the marginal edge of the leather portion of the outsole is covered by resinous compound which takes high finish from the mold. It also eliminates all the welt handling steps that require the most highly skilled and expensive labor in the construction of welt shoes, such as welt-sewing, welt-beating and outsole stitching, as well as the usual rough-rounding, edge trimming and stitch-separating or wheeling operations.

The process of my invention is characterized by the employment of a preformed leather sole piece which is accurately placed in a mold having the contour of the finished sole, the sole piece filling the mold from side to side and extending rearwardly to a point behind the heel breast line. In its preferred form the leather sole piece is outwardly beveled about its marginal edge so that it will make an interlocking bond with the molded marginal wall of the resinous compound and exposes to view only a narrow strip or feather. For example, the marginal edge of the sole piece and the molded wall of the resinous compound may have with each other a meeting angle of approximately 45°.

Preferably and as herein shown the resinous compound is injected into the mold cavity through a hole provided for that purpose in the sole piece. Advantage is taken of this fact to locate the sole piece longitudinally in the mold by inserting a stationary injection nozzle which is a part of the press into the hole of the sole. The injection nozzle thus supplements the side mold members in locating the sole piece so that it is positively held in the mold against shifting in either direction during the injection operation.

In order to improve and strengthen the bond between the leather sole piece and the underlying PVC ply it is proposed to form interlocking perforations, slots or holes in the sole piece and projecting studs or pins which project from the PVC layer and fill the perforations of the soles. In the invention as herein shown advantage for this purpose is taken of the hole provided in the sole piece for injection of the PVC and in the injection process a stud is formed which interlocks with this hole.

These and other features of the invention will be best understood and appreciated from the following description of one satisfactory procedure for carrying it out, selected for purposes of illustration and shown in the accompanying drawings, in which—

Figure 4:
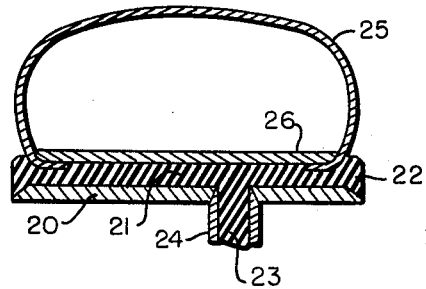
Figure 5:
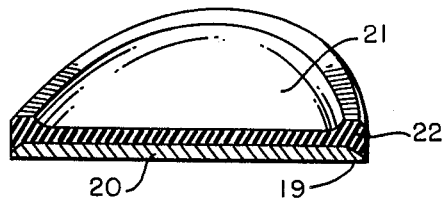

FIG. 1 is a plan view of a sole unit,
FIG. 2 is a corresponding view in side elevation, partly in section,
FIG. 3 is a plan view of a sole unit with portions of the mold indicated in dot and dash lines,
FIG. 4 is a view in section on the line 4—4 of FIG. 3, and
FIG. 5 is a cross-sectional view showing the forepart of a sole unit.

The sole unit shown in FIGS. 1 and 2 comprises a preformed leather sole piece 10, which in this case forms a tread surface of substantial area, extending from about the shank to the tip. It is embedded in and surrounded by an integral frame of PVC or other elastomeric or vinyl compound of similar characteristics, such as a vinyl chloride-vinyl acetate copolymer, a vinyl chloride-vinylidene chloride copolymer, or mixtures thereof.

The leather sole piece 10 is permanently bonded to an underlying and coextensive ply 11 which forms a part of the PVC component of the unit. The piece 10 is also surrounded by a marginal bead 12 of PVC which provides the unit with a mold-finished edge.

In forming the unit, as already explained, the molten PVC is injected through a hole formed in the sole piece 10 and this hole is filled when the PVC is solidified and cured by an upstanding stud or pin 13 that interlocks with the sole pieces and improves the bond between the PVC ply 11 and the sole piece. For the same purpose the sole piece is beveled or undercut at its rear edge as shown. It will be apparent that additional holes and studs may be provided if desired at other locations in the sole piece.

The unit includes also a preformed leather heel lift 14 which is embedded in the PVC of the heel end of the unit and provided with a hole for an interlocking pin 15 of PVC. This lift is also surrounded with a marginal mold-finished bead of PVC. The shank portion of the illustrated unit is formed of solid PVC.

It will be understood that the unit is completely formed in a single injection step, the leather sole piece and heel lift being placed in a mold of the kind fully described in my copending application Serial No. 209,090 filed July 11, 1962 and the PVC being molded against the bottom of a lasted shoe or against a mold member of substantially the same contour as the shoe bottom. The sole unit herein described may be manufactured and sold as an article of commerce and subsequently attached to the bottom of a lasted shoe, or it may be bonded to the shoe bottom in the injection step.

The sole unit shown in FIGS. 3–5 is of different construction in that it includes a preformed sole piece 20 which extends from the tip of the unit to a point behind the heel breast line and for the full width of the unit. The PVC component includes a continuous coextensive ply 21 permanently bonded to the sole piece and having marginal mold-finished bead 22. The sole piece is beveled about its margin, meeting the bead 22 at approximately a 45° angle and thus covering the marginal edge of the sole piece except for an exposed feather line of leather which has an oranmental effect.

The heel includes a leather lift 21 having a dovetailed rear edge into which is molded a PVC segment 24. A substantial portion of the heel beneath the lift 21 is molded of PVC.

In FIG. 3 portions of the mold are suggested in dot-and-dash lines and the mold includes the nozzle 24, shown in FIG. 4, through which PVC is injected into the mold cavity. The sprue or plug 23 is cut off flush with the outer face of the sole piece 20. The inner end of the nozzle 24 is tapered so that the plug 23 will fill the hole in the sole piece and interlock therewith.

In FIG. 4 the composite sole is represented as being molded against the bottom of a lasted shoe having an upper 25 and an insole 26 of conventional construction. In this case the PVC ply 21 becomes bonded in the shoe bottom in the injection molding step, that is to say, the ply 21 becomes permanently bonded to the insole 26 and overlasted margin of the upper 25 on one side, and to the preformed leather sole piece 20 on the other side. If it is desired to produce a separate composite sole, like that shown in FIG. 5, a metal mold member is substituted for the shoe bottom shown in FIG. 4, the mold being shaped to form the PVC ply and the marginal bead or sheath of the shape shown in FIG. 5.

While the preformed sole pieces 10 and 20 have been referred to as consisting of sole leather, any other tough and flexible material may be employed that is suitable for the tread surface of the sole.

An important advantage of the sole unit herein disclosed is that the leather sole piece may be preformed from any available sole leather of commercial tannage since such leather may be subjected without damage to the curing temperature of PVC, about 370° F. Such leather would be damaged if subjected to the higher temperatures required in a vulcanized sole bottom.

While I prefer to inject the PVC through the leather sole piece, as shown in FIG. 4 for example, it would be within the scope of the invention to inject it through the mold member engaging the inner face of the unit.

Having thus disclosed my invention, and described in detail illustrative embodiments thereof, I claim as new and desire to secure by Letters Patent:

An outsole unit comprising a leather sole piece of the full width of the shoe bottom and a lenth extending rearwardly of the heel breast line, the marginal edge of the forepart of the sole piece being outwardly beveled to a feather at its outer edge, and a layer of resinous compound bonded to the inner surface of the sole piece and sheathing the edge thereof with an outwardly tapering wall having a smooth finished edge surface and exposing the feather line of the leather shoe piece.

References Cited by the Examiner
UNITED STATES PATENTS

| 10,008 | 9/53 | Chilcott et al. | 36—30 |
| 58,623 | 10/66 | Elliott | 36—30 |
| 2,826,832 | 3/58 | Rollman et al. | 36—28 |
| 3,116,566 | 1/64 | Ferreira | 36—30 |

FOREIGN PATENTS

| 1,016,468 | 8/52 | France. |
| 831,962 | 2/52 | Germany. |
| 552,037 | 11/56 | Italy. |

JORDAN FRANKLIN, *Primary Examiner.*